United States Patent Office 3,044,845
Patented July 17, 1962

3,044,845
PROCESS FOR PRODUCING DICHLOROSILANE
Victor B. Jex, Clarence, John E. McMahon, Buffalo, and William G. Whitehead, Kenmore, N.Y., assignors to Union Carbide Corporation, a corporation of New York
No Drawing. Filed Sept. 30, 1958, Ser. No. 764,229
9 Claims. (Cl. 23—14)

This invention relates to a process for producing dichlorosilane from trichlorosilane.

Chlorosilanes are usually produced by a process that involves heating a mixture of hydrogen chloride and silicon in the presence of catalysts, such as copper. Such processes yield predominately trichlorosilane and relatively small amounts of dichlorosilane, which is a particularly desirable material in itself. For example dichlorosilane is very useful as a starting material in preparing certain types of organosilicon compounds. By way of illustration, United States Patent 2,632,013 discloses a process for reacting dichlorosilane and ethylene to produce diethyldichlorosilane which is a useful starting material in the production of silicone resins and elastomers.

Several processes have been proposed for converting trichlorosilane to dichlorosilane. These processes involve heating a mixture of trichlorosilane and a catalyst, such as an alkyl amine, a heterocyclic amine, a metal halide, a cyanamide, a nitrile, hydrogen cyanide and the like, to cause trichlorosilane to react to produce dichlorosilane according to a disproportionation reaction that is represented by the equation:

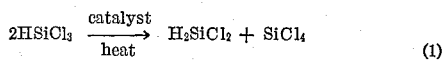

$$2HSiCl_3 \xrightarrow[\text{heat}]{\text{catalyst}} H_2SiCl_2 + SiCl_4 \qquad (1)$$

Such known processes for producing dichlorosilane are not satisfactory for several reasons. They require reaction temperatures of 100° C. and above which are hazardous in view of the low boiling point and inflammability of dischlorosilane. In addition, low yields of dichlorosilane are obtained in some of such processes.

It is the object of this invention to provide an improved process for converting trichlorosilane to dichlorosilane by disproportionation whereby such disproportionation can be achieved at substantially lower temperatures than those heretofore necessary and whereby higher yields of dichlorosilane can be obtained.

According to this invention, dichlorosilane can be produced from trichlorosilane by an improved process which involves forming a mixture of trichlorosilane, hexamethyltriaminotriazine or pyridine or a hydrocarbon-substituted pyridine as a catalyst and, as a promoter for the catalyst, a liquid halohydrocarbon in which trichlorosilane is soluble and heating the mixture to a temperature below 100° C. to cause the trichlorosilane to disproportionate to produce dichlorosilane.

The catalysts that are useful in this invention include hexamethyltriaminotriazine, pyridine and hydrocarbon-substituted pyridines. The later-mentioned pyridine type compounds may be represented by the formula:

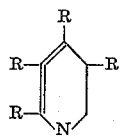

(2)

wherein R is a hydrogen atom or a monovalent hydrocarbon group, such as an alkyl or an alkenyl group. In Formula 2, R may be the same or different. Illustrative of these catalysts are pyridine, 4-methylpyridine, 4-ethylpyridine, 4-vinylpyridine, 4-allylpyridine, 4-(s-nonyl)pyridine, 3-methyl-4-ethylpyridine 3,4-dimethylpyridine and the like. The preferred catalysts are hexamethyltriaminotriazine and the 4-alkylpyridines wherein the alkyl group contains from 1 to 4 carbon atoms. Especially effective catalysts are 4-ethylpyridine and 4-methylpyridine.

Compounds represented by Formula 2 are often obtained from coal tar. These compounds, when so obtained, are usually mixed with other compounds such as quinoline, hydrocarbon-substituted quinolines, isoquinoline, hydrocarbon-substituted isoquinolines, indole, and hydrocarbon-substituted indoles. The compounds represented by Formula 2 need not be separated from such mixtures in order to be used as catalysts in this invention.

Other heterocyclic amines, nitriles and alkyl amines were not found to be particularly effective as catalysts in this process. Illustrative of such unsuitable heterocyclic amines are those that contain sterically hindered nitrogen atoms, such as 2,6-diorgano-substituted pyridines, and very weakly basic heterocyclic amines, such as quinoline and isoquinoline.

The relative amount of the catalyst used in this invention is not narrowly critical. From about 0.1 part to 10 parts by weight of the catalyst per 100 parts by weight of the trichlorosilane are useful but from 2 parts to 4 parts by weight of the catalyst per 100 parts by weight of the trichlorosilane are preferred. Other relative amounts of the catalyst may be used but no commensurate advantage is gained thereby.

In the practice of this invention a promoter is employed along with the above-described catalysts. As used herein, the term "promoter" denotes a compound that is not a catalyst but that increases the effectiveness of another compound that is, by itself, a catalyst.

Halohydrocarbons in which trichlorosilanes are soluble are generally useful as promoters in this invention. As used herein the term "halohydrocarbon" denotes an organic compound that contains at least one halogen atom attached to a carbon atom and at least one hydrogen atom attached to a carbon atom. These halohydrocarbons may contain such functional groups as ethers, hydroxyl, ester and epoxy groups and they may have more than one type of halogen atom attached to the same or different carbon atoms. Included among these halohydrocarbons are halogenated alkyl compounds, halogenated aralkyl compounds, halogenated ethers, halogenated esters, halogenated epoxy compounds, halogenated aromatic compounds and the like. Illustrative of these halohydrocarbons are chloroform, methylene chloride, 1,1,2-trichloroethane, 1,1,1-trichloroethane, 1,1-dichloroethane, 1,2-dichloroethane, sym-tetrachloroethane, pentachloroethane, 1,2-dichloropropane, 1,1,2-trichloropropane, 1,1,1,2-tetrachloropropane, 1,2,3-trichloropropane, 1-chloro-2,3-dibromopropane, 1,1,2,3-tetrachloropropane, 2-chlorobutane, 1-chlorobutane, 2,3-dichlorobutane, 1,2-dichloropropane, 2,3-dichlorobutane, 1,4-dichlorobutane, 1,5-dichloropentane, 1,3-dichlorobutane, the isomeric trichloropentanes, the isomeric tetrachloropentanes, the isomeric dichloropentanes, 2,2'-dichloroethyl ether, triethylene glycol dichloride, monochlorobenzene, 1,2,4-trichlorobenzene, 1,2-dichloroethylbenzene, ethyl chloroacetate, epichlorohydrin, chlorinated biphenyls, chlorinated terphenyls, and the like. The halohydrocarbons that are preferred in this invention are chloro-alkanes such as sym-tetrachloroethane, 1,3-dichlorobutane, 1,4-dichlorobutane and 1,5-dichloropentane.

When the halohydrocarbon contains a functional group, such as a hydroxyl or an epoxy group, the halohydrocarbon may react with the trichlorosilane. The products of such reactions may also be effective promoters in this invention. By way of illustration, 2,3-dichloro propanol-1 (ClCH$_2$CHClCH$_2$OH) and trichlorosilane react to produce (ClCH$_2$CHClCH$_2$O)$_3$SiH which is an effective promoter in this process.

Organic compounds containing only halogen atoms bonded directly to carbon atoms (e.g., carbon tetrachloride and tetrachloroethylene) were not found to be useful as promoters in this invention. Other liquid organic compounds in which trichlorosilane is soluble (i.e. solvents other than halohydrocarbons, e.g. n-heptane) were similarly not effective as promoters for the catalysts used in this invention.

In the production of any given halohydrocarbon, isomers and other halohydrocarbons are usually produced concurrently. Such mixtures of products are useful as promotors in this invention.

The relative amount of the halohydrocarbon used in this invention is not narrowly critical. From 10 parts to 1000 parts by volume of the halohydrocarbon per 100 parts by volume of the trichlorosilane are useful but from 30 parts to 100 parts by volume of the halohydrocarbon per 100 parts by volume of the trichlorosilane are preferred. Other relative amounts of the halohydrocarbon may be used but it is generally desirable to adhere to the above ranges.

In the practice of this invention the temperature to which the mixture of trichlorosilane, a catalyst and a promoter are heated is below 100° C. Temperatures from about 35° C. to about 80° C. are useful but temperatures from about 45° C. to about 70° C. are preferred. The use of temperatures of about 100° C. or above is hazardous in view of the inflammability and volatility of dichlorosilane. At temperatures below 35° C. the disproportionation reaction proceeds slowly.

The process of the instant invention may be conducted in any convenient manner. It is preferred to conduct the process of the invention by charging trichlorosilane, the catalyst and the promoter to a distillation vessel. The vessel is fitted with a reflux condenser to which is attached a distilling head and a receiver. Prior to charging the vessel, the vessel should be purged with an inert gas and an atmosphere of an inert gas should be maintained in the vessel during the process so that combustion or hydrolysis of dichlorosilane does not occur. Suitable inert gases for this purpose are nitrogen, argon and the like. The contents of the flask are heated to the boiling point and then maintained at this temperature for about seven hours while refluxing occurs. A distillate, containing the dichlorosilane product, is collected over the seven-hour period. The catalyst, promoter and the silicon tetrachloride produced along with the dichlorosilane remain in the distilling flask. The silicon tetrachloride may be separated from the promoter and the catalyst and then the promoter and the catalyst may be used in another run. Throughout the process of this invention anhydrous conditions are maintained.

The following examples illustrate the present invention:

EXAMPLE I

To a 250 ml. round-bottom, distilling flask, there was charged an equivolume mixture of redistilled sym-tetrachloroethane (75 ml.) and trichlorosilane (75 ml., 100.1 g., 97.6 mol-percent pure).

Redistilled 4-methylpyridine (1.8 ml. 1.7 g.) was added slowly. The flask was attached to a vacuum jacketed column (50 cm. long, I.D. 12 mm., pack with 6 x 8 mesh polysurface alumina pellets) and heated to reflux. The head and receiver were cooled with Dry Ice-acetone mixture. The system was previously purged with argon and was blanketed with argon during the distillation. The mixture was refluxed at 55° C. for 7 hours and a distillate (B.P. 8.5°–10° C.) was removed intermittently from the head. Total take-off was 16.8 g., which was sampled and analyzed by infra-red measurements.

Table I
INFRA-RED ANALYSIS

|  | Mol, Percent | Wt., Percent | Wt. (grams) |
|---|---|---|---|
| H$_2$SiCl$_2$ | 85.7 | 85.94 | 14.44 |
| HSiCl$_3$ | 9.1 | 10.98 | 1.84 |
| SiCl$_4$ | None | None | None |
| Diff. (H$_3$SiCl) | 5.2 | 3.08 | 0.52 |

EXAMPLE II

An equivolume mixture of trichlorosilane (100 ml., 133.5 g., 87 mol-percent pure) and a mixture of dichloropentanes (100 ml., distillation range: 95% between 130° C.–200° C.) was placed in a 250 ml. distilling flask. 4-methylpyridine (2.7 g.) was added slowly to produce a heterogeneous mixture. The flask was attached to a vacuum-jacketed column (50 cm. long, I.D. 12 mm., packed with polysurface alumina pellets 6 x 8 mesh) and heated to reflux. A Dry Ice-acetone mixture was used to cool the head and receiver. The system was previously purged with argon and was blanketed with argon throughout the distillation. The mixture was refluxed at 57.5°–66.0° C. for 7 hours and distillate (B.P. 10.0°–11.0° C.) was removed intermittently from the head. Total take-off was 16.7 g. which was sampled and analyzed by infra-red measurements.

Table II
INFRA-RED ANALYSIS

|  | Mol, Percent | Wt., Percent | Wt. (grams) |
|---|---|---|---|
| H$_2$SiCl$_2$ | 87.7 | 84.6 | 14.2 |
| HSiCl$_3$ | 11.7 | 15.2 | 2.5 |
| SiCl$_4$ | None | None | None |
| Diff. (H$_3$SiCl) | 0.6 | 0.3 | |

EXAMPLE III

To a 250 ml. round bottom, distilling flask there was charged an equivolume mixture of redistilled sym-tetrachloroethane (100 ml.) and trichlorosilane (100 ml., 133.5 g., 93 mol-percent pure). A mixture of pyridines (5.34 g., 4.0 wt.-percent based on HSiCl$_3$) was added slowly to give a clear homogeneous mixture. The mixture of pyridines contained 13 parts by weight pyridine, 33 parts by weight 2-methyl pyridine, 11 parts by weight 3-methyl pyridine, 11 parts by weight 4-methyl pyridine, 11 parts by weight 2,6-dimethyl pyridine and 21 parts by weight of higher boiling organic bases per 100 parts by weight of the mixture. Flask was attached to a vacuum-jacketed column (50 cm. long, I.D. 12 mm.) packed with polysurface alumina pellets (6 x 8 mesh) that had been previously purged with argon. The head and receiver were cooled with Dry Ice-acetone mixtures, and the system was blanketed with argon during the distillation. The mixture was refluxed at 49°–65.5° C. for 7 hours, and distillate (B.P. 8.0°–10.0° C.) was removed intermittently from the head. Total take-off was 33.6 g., which was sampled and analyzed by infra-red measurements.

Table III
INFRA-RED ANALYSIS

|  | Mol, Percent | Wt., Percent | Wt. (grams) |
|---|---|---|---|
| H$_2$SiCl$_2$ | 86.9 | 83.5 | 28.1 |
| HSiCl$_3$ | 9.9 | 14.6 | 4.9 |
| SiCl$_4$ | None | None | None |
| Diff. (H$_3$SiCl) | 3.2 | 1.9 | 0.6 |

EXAMPLE IV

Using the procedure described in Example I, trichlorosilane was disproportionated using several different halohydrocarbons. Equal volumes of the indicated halohydrocarbon and trichlorosilane were used in each experiment. In each experiment two parts by weight of 4- methyl pyridine per 100 parts of the trichlorosilane were used. The halohydrocarbons used, the amounts of $HSiCl_3$ disproportionated according to Equation 1 and the reflux temperatures are shown on Table IV.

Table IV

| Halohydrocarbon | $HSiCl_3$ Disproportionated (Percent by weight) | Pot Temp., °C. at Reflux |
|---|---|---|
| none | 7.0 | 36 |
| chloroform | 12.4 | 51–53 |
| methylene chloride ($CH_2Cl_2$) | 20.6 | 39 |
| 1,1-dichloropropane | 18.8 | 46–47 |
| 2-chlorobutane | 13.8 | 53–54 |
| 1-chlorobutane | 16.2 | 53–56 |
| monochlorobenzene | 33.7 | 57.5–64 |
| ethyl chloroacetate | 44.4 | 50–79 |
| 1,2-dichloroethane | 34.9 | 52–58 |
| s-tetrachloroethane | 43.0 | 55 |
| $(ClCH_2\text{-}CHCl\text{-}CH_2O)_3SiH$ | 22.5 | 44–51 |
| pentachloroethane | 18.9 | 56.6–62 |
| 1,1,1-trichloroethane | 14.4 | 50–56 |
| 1,2-dichloropropane | 24.9 | 55–58 |
| 1,1,2-trichloropropane | 35.1 | 55–65 |
| 1,1,1,2-tetrachloropropane | 30.2 | 55–65 |
| 2,3-dichlorobutane | 30.0 | 55–62 |
| 1,4-dichlorobutane | 44.6 | 56–64 |
| 1,3-dichlorobutane | 65.0 | 57–69 |
| 1,5-dichloropentane | 51.9 | 53–69 |
| 1,2-dichloroethylbenzene | 24.8 | 45–52 |
| 2,2'-dichloroethyl ether | 43.7 | 47–57 |
| triethylene glycol dichloride [1] | 42.9 | 52–55 |
| 1-chloro-2,3-dibromopropane | 30.0 | 51–54 |
| 1,1,2,3-tetrachloropropane | 39.9 | 53–62 |
| 1,2,4-trichlorobenzene | 15.2 | 53–55 |

[1] $ClCH_2CH_2OCH_2CH_2OCH_2CH_2Cl$.

The results shown in Table IV indicate that a wide variety of halohydrocarbons are useful as promoters in this invention. The results also indicate that the reaction products of halohydrocarbons containing functional groups and $HSiCl_3$ (e.g. $(ClCH_2CHClCH_2O)_3SiH$ which is the reaction product of 2,3-dichloropropanol-1 [i.e. $ClCH_2CHClCH_2OH$] and $HSiCl_3$) are also useful as promoters.

EXAMPLE V

Using the procedure described in Example I, trichlorosilane was disproportionated using mixtures of halohydrocarbons. These mixtures are typical of the mixtures obtained in the production of halohydrocarbons. Equal volumes of trichlorosilane and the indicated mixtures of halohydrocarbons were used in each experiment. In each experiment 2 parts by weight of 4-methyl pyridine per 100 parts by weight of the trichlorosilane were used. The mixtures used, the amount of $HSiCl_3$ disproportionated according to Equation 1 and the reflux temperature are shown on Table V.

Table V

| Halohydrocarbons | Percent $HSiCl_3$ (By Wt.) Disproportionated | Pot Temp., °C at Reflux |
|---|---|---|
| A mixture of chlorinated biphenyls containing from 1 to 9 chlorine atoms per molecule and chlorinated terphenyls containing from 5 to 9 chlorine atoms per molecule. The mixture is a colorless mobile oil having a distillation range from 275° C. to 320° C., Refractive Index (D–20° C.) 1.617–1.618 and Specific Gravity 25/25 1.182 | 27.4 | 49–55 |
| A mixture containing chlorinated biphenyls containing from 1 to 9 chlorine atoms per molecule and chlorinated terphenyls containing from 5 to 9 chlorine atoms per molecule. The mixture is a practically colorless mobile oil having a distillation range from 290° C. to 320° C., Refractive Index (D–20° C. 1.620–1.622 and Specific Gravity 25/25 1.266 | 23.1 | 45–49 |
| A mixture of isomeric dichloropentanes. The mixture is a colorless mobile liquid 95% of which distills between 130° C. and 200° C. | 28.6 | 57.5–66 |
| A mixture of chlorinated pentanes containing an average of 3 chlorine atoms per molecule | 40.1 | 47–55 |
| A mixture of chlorinated pentanes containing an average of 4 chlorine atoms per molecule | 35.5 | 44–50 |

The results shown on Table V indicate that mixtures of halohydrocarbons are useful as promoters in this invention.

EXAMPLE VI

Using the procedure described in Example I, trichlorosilane was disproportionated in several experiments using various catalysts and different relative amounts of trichlorosilane and sym-tetrachloroethane. The amounts of catalysts, $HSiCl_3$ and halohydrocarbon used, the amounts of $HSiCl_3$ disproportionated according to Equation 1 and the reflux temperatures are shown on Table VI.

Table VI

| Catalyst | | $HSiCl_3$ (vol., percent) [2] | $HSiCl_3$ Disproportionated (mol, percent) | Pot Temp., °C. at Reflux |
|---|---|---|---|---|
| Type | Amount [1] | | | |
| 4-methylpyridine | 2 | [3] 100.0 | 7.0 | 36 |
| Do | 2 | 66.7 | 30.0 | 48–50 |
| Do | 2 | 50.0 | 43.0 | 55 |
| Do | 2 | 33.3 | 47.8 | 74–82 |
| Do | 2 | [4] 50.0 | 34.9 | 52–58 |
| Do | 2 | [4] 33.3 | 48.9 | 59–65 |
| 4-vinylpyridine | 2 | [3] 100.0 | 2.9 | 39–40.5 |
| Do | 2 | 66.7 | 19.8 | 46–50 |
| Do | 2 | 50.0 | 42.9 | 52–64 |
| 4-ethylpyridine | 2 | [3] 100.0 | 6.6 | 34–34.5 |
| Do | 4 | 80.0 | 41.8 | 40.5–48 |
| Do | 4 | 66.7 | 65.3 | 44–62 |
| Do | 4 | 50.0 | 58.2 | 52.5–69 |
| Do | 4 | 33.3 | 71.4 | 67–84.5 |

[1] Parts by weight per 100 parts by weight $HSiCl_3$.
[2] Balance is the halohydrocarbon.
[3] No halohydrocarbon used.
[4] 1,2-dichloroethane used as solvent in this run.

Table VI indicates that the relative amount of $HSiCl_3$ and halohydrocarbon used in this invention may vary widely.

EXAMPLE VII

Using the procedure described in Example I, trichlorosilane was disproportionated using different relative amounts of catalyst and trichlorosilane. Equal volumes of trichlorosilane and the indicated halohydrocarbon were used in each experiment. The catalyst and halohydrocarbon used, the amount of $HSiCl_3$ disproportionated according to Equation 1, and the reflux temperature are shown on Table VII.

Table VII

| Catalyst | | Halohydrocarbon | $HSiCl_3$ Disproportionated (Percent by weight) | Pot Temp., °C. at reflux |
|---|---|---|---|---|
| Type | Amount [1] | | | |
| 4-methylpyridine | 2 | 1,2-dichloroethane | 35.9 | 51–52 |
| | 2 | s-tetrachloroethane | 43.0 | 55 |
| | 4 | do | 44.4 | 55–66.5 |
| 4-vinylpyridine | 2 | do | 42.9 | 52–64 |
| | 4 | do | 63.1 | 55–74 |
| | 1 | do | 23.3 | 52–55.5 |
| 4-ethylpyridine | 2 | do | 54.6 | 51.5–64 |
| | 4 | do | 58.2 | 52.5–69 |
| | 8 | do | 61.9 | 51.5–69 |
| none | | do | 2.7 | 49.5–51 |

[1] Parts by weight per 100 parts by weight of $HSiCl_3$.

Table VII indicates that the amount of catalyst used in this invention may vary widely.

EXAMPLE VIII

Using the procedure described in Example I, trichlorosilane was disproportionated using no halohydrocarbon. Equal volumes of trichlorosilane and the indicated solvent were used in each experiment. In each experiment 2 parts by weight of 4-methylpyridine per 100 parts by weight of trichlorosilane were used. Trichlorosilane is soluble in each of the solvents used. The solvents used, the amount of HSiCl₃ disproportionated according to Equation 1 and the reflux temperature are shown in Table VIII.

*Table VIII*

| Solvent | HSiCl₃ Disproportionated (Percent by weight) | Pot Temp., ° C. at reflux |
|---|---|---|
| n-heptane | 4.1 | 55–56 |
| carbon tetrachloride | 2.7 | 52.5 |
| tetrachloroethylene | 4.9 | 57 |
| none | 7.0 | 36 |

Table VIII indicates that solubility effects alone do not account for the results obtained in this invention.

EXAMPLE IX

Using the procedure described in Example I, trichlorosilane was disproportionated using several different catalysts. Equal volumes of sym-tetrachloroethane and trichlorosilane were used in each experiment. Two parts by weight of the indicated catalyst per 100 parts by weight of trichlorosilane were used in each experiment. The catalysts used, the amount of HSiCl₃ disproportionated according to Equation 1 and the reflux temperature are shown on Table IX.

*Table IX*

| Catalyst | | HSiCl₃ Disproportionated (Percent by weight) | Pot Temp., ° C. at reflux |
|---|---|---|---|
| Compound | Amount¹ | | |
| none | | 2.7 | 49.5–51 |
| triethylamine | 2 | 14.3 | 57–57.5 |
| tri-n-amylamine | 4 | 5.1 | 54.5–56.5 |
| t-butylamine | 4 | 7.1 | 53–54 |
| t-octylamine | 1 | 8.5 | 53–55 |
| hexamethyltriaminotriazine ² | 2 | 71.8 | 54.5–73 |
| pyridine | 2 | 17.9 | 57 |
| 4-methylpyridine | 2 | 43.0 | 55 |
| 4-(s-nonyl) pyridine | 2 | 25.4 | 61–63 |
| 4-vinylpyridine | 2 | 42.9 | 52–64 |
| 3-methyl-4-ethylpyridine | 2 | 48.7 | 52–66 |
| 3,4-dimethylpyridine | 2 | 54.2 | 55–69 |
| 4-ethylpyridine | 2 | 54.6 | 52–64 |
| adiponitrile | 2 | 2.7 | 49.5–51 |
| benzonitrile | 2 | 4.5 | 55–56 |

¹ parts by weight per 100 parts by weight of HSiCl₃.

²
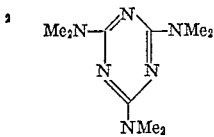

The results shown on Table IX indicate that hexamethyltriaminotriazine and compounds represented by Formula 2 are useful catalysts in this invention whereas nitriles and alkyl amines are generally not particularly useful.

EXAMPLE X

Using the procedure described in Example I, trichlorosilane was disproportionated using mixtures obtained from coal tar as catalysts. Equal volumes of sym-tetrachloroethane and trichlorosilane were used in each experiment. Four parts by weight of the indicated mixtures per 100 parts by weight of the trichlorosilane were used in each experiment. The amount of HSiCl₃ disproportionated according to Equation 1 is shown on Table X.

*Table X*

| Catalyst | HSiCl₃ Disproportionated (Percent by weight) | Pot Temp., ° C. at reflux |
|---|---|---|
| A mixture of hydrocarbon-substituted pyridines represented by Formula 2 with a boiling range from 173° C. to 185° C. | 34.3 | 52.5–61 |
| A mixture of hydrocarbon-substituted pyridines represented by Formula 2 with a boiling range from 194° C. to 199° C. | 59.9 | 51.5–66 |
| A mixture of hydrocarbon-substituted pyridines represented by Formula 2 with a boiling range from 216° C. to 327° C. | 45.7 | 50.5–57.5 |
| A mixture of pyridine and methyl-substituted pyridines represented by Formula 2 obtained from coal tar and having a boiling point range from 122° C. to 155° C. (same as used in Example III) | 61.9 | 49–65.5 |
| A mixture of dimethyl-substituted, methyl-substituted and methyl ethyl-substituted pyridines represented by Formula 2 that boils from 122° C. to 165° C. | 48.3 | 53–70–5 |

What is claimed is:
1. A process for producing dichlorosilane comprising forming a mixture of trichlorosilane, a compound in which trichlorosilane is soluble, said compound being a halohydrocarbon containing at least one hydrogen atom attached to carbon and at least one halogen atom attached to carbon, and a catalyst selected from the group consisting of hexamethyltriaminotriazine and catalysts represented by the formula:

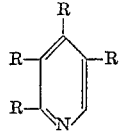

wherein R is a member selected from the group consisting of the hydrogen atom and the monovalent hydrocarbon groups, and heating the mixture to a temperature below about 100° C. to cause the trichlorosilane to disproportionate to produce dichlorosilane, said halohydrocarbon being present in the mixture in an amount from 10 parts to 1000 parts by volume per 100 parts by volume of the trichlorosilane.

2. A process for producing dichlorosilane comprising forming a mixture of trichlorisilane, a chloro-alkane containing at least one hydrogen atom attached to carbon and at least one chlorine atom attached to carbon, and a catalyst represented by the formula:

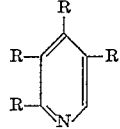

wherein R is a member selected from the group consisting of the hydrogen atom and the monovalent hydrocarbon groups and heating the mixture to a temperature from 35° C. to 80° C. to cause the trichlorosilane to disproportionate to produce dichlorosilane, said chloroalkane being present in an amount from 10 parts to 1000 parts by volume per 100 parts by volume of the trichlorosilane.

3. A process for producing dichlorosilane comprising forming a mixture of trichlorosilane, a chloro-alkane containing at least one hydrogen atom attached to carbon and at least one chlorine atom attached to carbon, and a catalyst represented by the formula:

wherein R is a member selected from the group consisting of the hydrogen atom and the alkyl groups and heating the mixture to a temperature from 35° C. to 80° C. to cause the trichlorosilane to disproportionate to produce dichlorosilane, said chloro-alkane being present in an amount from 10 parts to 1000 parts by volume per 100 parts by volume of the trichlorosilane.

4. A process for producing dichlorosilane comprising forming a mixture of trichlorosilane, a chloro-alkane containing at least one hydrogen atom attached to carbon and at least one chlorine atom attached to carbon, and a catalyst represented by the formula:

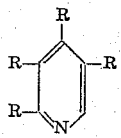

wherein R is a member selected from the group consisting of the hydrogen atom and the alkenyl groups and heating the mixture to a temperature from 35° C. to 80° C. to cause the trichlorosilane to disproportionate to produce dichlorosilane, said chloro-alkane being present in an amount from 10 parts to 1000 parts by volume per 100 parts by volume of the trichlorosilane.

5. A process for producing dichlorosilane comprising forming a mixture of trichlorosilane, a chloro-alkane containing at least one hydrogen atom attached to carbon and at least one chlorine atom attached to carbon and a 4-alkyl pyridine wherein the alkyl group contains from 1 to 4 carbon atoms and heating the mixture to a temperature from 45° C. to 70° C. to cause the trichlorosilane to disproportionate to produce dichlorosilane, said chloro-alkane being present in the mixture in an amount from 10 parts to 1000 parts by volume per 100 parts by volume of the trichlorosilane and said 4-alkyl pyridine being present in the mixture in an amount from 0.1 part to 10 parts by weight per 100 parts by weight of the trichlorosilane.

6. A process for producing dichlorosilane comprising forming a mixture of trichlorosilane, a chloro-alkane containing at least one hydrogen atom attached to carbon and at least one chlorine atom attached to carbon and a hexamethyltriaminotriazine and heating the mixture to a temperature from 45° C. to 70° C. to cause the trichlorosilane to disproportionate to produce dichlorosilane, said chloro-alkane being present in the mixture in an amount from 10 parts to 1000 parts by volume per 100 parts by volume of the trichlorosilane and said hexamethyltriaminotriazine being present in the mixture in an amount from 0.1 part to 10 parts by weight per 100 parts by weight of the trichlorosilane.

7. A process for producing dichlorosilane comprising forming a mixture of trichlorosilane, sym-tetrachloroethane and hexamethyltriaminotriazine and heating the mixture to a temperature from 45° C. to 70° C. to cause the trichlorosilane to disproportionate to produce dichlorosilane, said sym-tetrachloroethane being present in the mixture in an amount from 30 parts to 100 parts by the volume per 100 parts by volume of the trichlorosilane and said hexamethyltriaminotriazine being present in the mixture in an amount from 2 parts to 4 parts by weight per 100 parts by weight of the trichlorosilane.

8. A process for producing dichlorosilane comprising forming a mixture of trichlorosilane, 1,3-dichlorobutane and 4-methyl pyridine and heating the mixture to a temperature from 45° C. to 70° C. to cause the trichlorosilane to disproportionate to produce dichlorosilane, said 1,3-dichlorobutane being present in the mixture in an amount from 30 parts to 100 parts by volume per 100 parts by volume of the trichlorosilane and said 4-methyl pyridine being present in the mixture in an amount from 2 to 4 parts by weight per 100 parts by weight of the trichlorosilane.

9. A process for producing dichlorosilane comprising forming a mixture of trichlorosilane, sym-tetrachloroethane and 4-ethylpyridine and heating the mixture to a temperature from 45° C. to 70° C. to cause the trichlorosilane to disproportionate to produce dichlorosilane, said sym-tetrachloroethane being present in the mixture in an amount from 30 parts to 100 parts by volume per 100 parts by volume of the trichlorosilane and said 4-methyl pyridine being present in the mixture in an amount from 2 to 4 parts by weight per 100 parts by weight of the trichlorosilane.

References Cited in the file of this patent

UNITED STATES PATENTS 2,834,648    Bailey et al. _____ May 13, 1958

OTHER REFERENCES

Mellor: "Comprehensive Treatise on Inorganic and Theoretical Chemistry," 1925, vol. VI, page 970.